July 28, 1931. J. W. JACKSON 1,816,224
LIGHTING ARRANGEMENT FOR AUTOMOBILES
Filed March 7, 1930
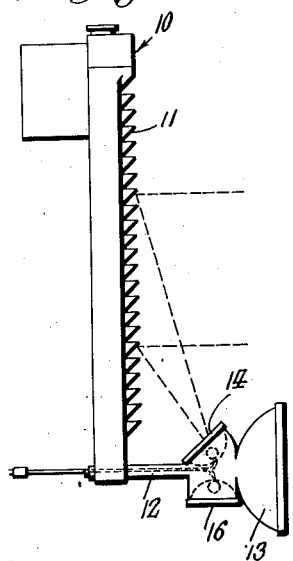
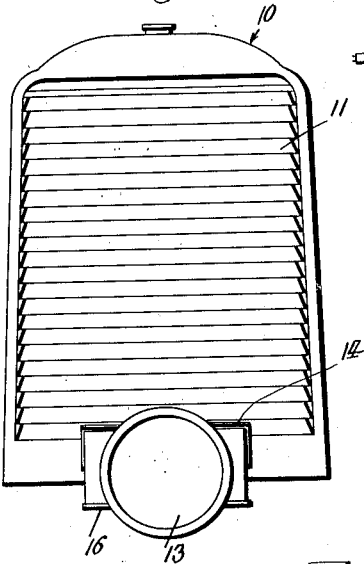
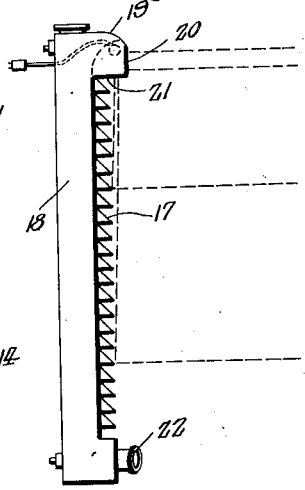
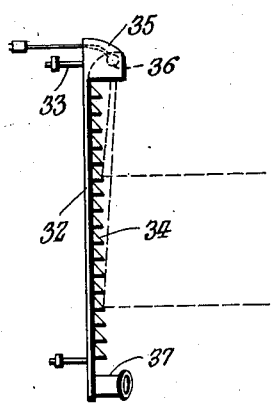
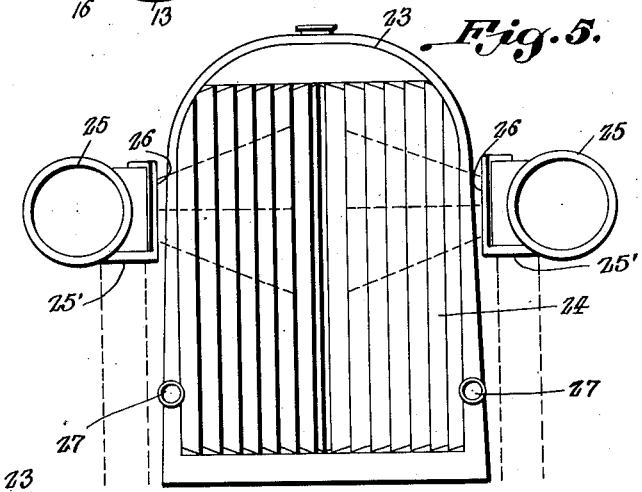
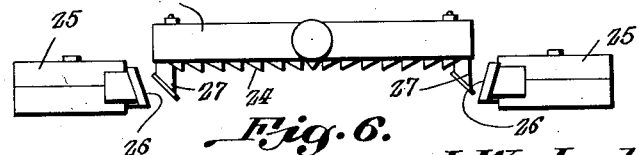
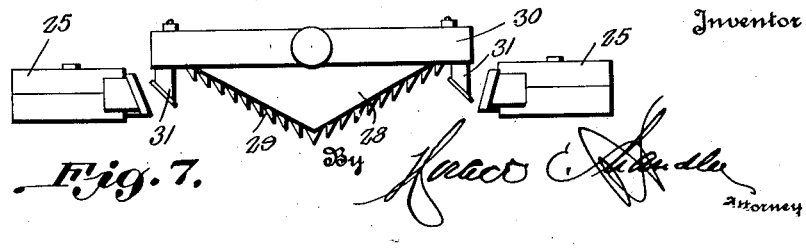
J. W. Jackson, Inventor Patented July 28, 1931

1,816,224

UNITED STATES PATENT OFFICE

JOHN W. JACKSON, OF NORTH AUGUSTA, SOUTH CAROLINA

LIGHTING ARRANGEMENT FOR AUTOMOBILES

Application filed March 7, 1930. Serial No. 434,136.

This invention relates to new and useful improvements in lighting arrangements for automobiles, and particularly to devices which are adapted to obviate the usual annoying and dangerous projection of blinding light rays, into the eyes of approaching drivers, and pedestrians.

One object of the invention is to provide a device of this character wherein the front of an automobile may be so illuminated as to render the same clear to the approaching drivers, and pedestrians, but not such as will blind such persons.

Another object is to provide a lighting arrangement whereby the front of an automobile may be well illuminated, and at the same time provide for illumination of the road immediately ahead, without glaring light rays reaching the eyes of approaching drivers and pedestrians.

Another object is to provide an automobile front of such construction that the same will reflect light rays projected thereon, down onto the road, for the benefit of the driver of the automobile, while at the same time producing a light which is nonglaring to the approaching drivers and pedestrians.

A further object is to provide a structure of this character whereby additional radiation surface is incorporated within the radiator, which will tend to cool the water in the radiator much more quickly.

Other objects and advantages will be apparent from the following description when taken in connection with the accompanying drawings.

In the drawings:

Figure 1 is a front elevation of one form of an automobile front, with the illuminating lamp mounted on the lower end of the radiator.

Figure 2 is a side elevation of the same.

Figure 3 is a side elevation of a modification of the device, wherein the reflecting blades or strips are canted or inclined upwardly, and the lamp casing mounted at the upper end of the radiator shell.

Figure 4 is a side elevation of the device showing the blades canting or inclining downwardly, and also showing attaching bolts, for securing the device to a radiator shell.

Figure 5 is a front elevation of a further modification wherein the reflecting blades or strips extend vertically with respect to the radiator, the front of the radiator being flat.

Figure 6 is a top plan view of the form shown in Fiigure 5.

Figure 7 is a top plan view, similar to Figure 6, but showing the front of the radiator as being double-beveled.

Referring to the accompanying drawings, and particularly to Figures 1 and 2, 10 represents the shell of the radiator of an automobile, in connection with which the present invention is used. Extending transversely of the central opening of said radiator shell 10, with their ends secured to the sides thereof, or formed integrally therewith, as may be desired, are the narrow strips 11, preferably formed from metal, and having their faces reflective. The strips 11 are canted or disposed in inclined planes and jalousied, with their outer edges disposed upwardly, as shown, and having their forward faces formed for reflecting light rays projected thereagainst. The strips 11 are so spaced apart as to provide for sufficient ventilation for the radiator, and incidentally provides for additional radiation surface. The forward faces of the strips 11 may be provided with suitable advertising legends, the name of the automobile, or the like, which will be seen by other persons. Mounted on the central portion of the lower end of the shell 10, and extending forwardly therefrom, is a bracket arm 12, and mounted on the forward end of said arm is a lamp casing 13. The main body of the lamp casing 13 is formed for directing light rays onto the road ahead of the automobile, while additional outlets 14 and 16 are provided for directing light rays upwardly against the reflecting faces of the strips 11, and downwardly on the road, respectively, as will be clearly seen by reference to Figures 1 and 2. The light projected upwardly against the reflecting faces of the strips 11 is reflected forwardly and downwardly on the road ahead of the automobile, such light being at a sufficient elevation as not to affect the eyes of approaching drivers and pedestrians, but providing proper illumination of the front of the automobile, that the automobile may be clearly seen by others.

In the form shown in Figure 3, the strips 17 cant or incline downwardly, with their upper faces formed for reflecting light rays, and mounted on the upper central portion of the radiator shell 18, is a lamp casing 19, said casing having a light projecting opening 20, in its front portion, for projecting light rays directly ahead, or through a translucent plate, fixed therein, such plate to have some legend formed thereon, as the name of the automobile, or some advertisement. The casing 19 is also provided with an opening 21, in its lower side, for directing light rays down on the road, and for directing light rays on the upper inclined faces of the strips 17, such light rays being reflected forwardly from the automobile, with the result that the illumination is sufficient to enable others to clearly see the automobile, without being blinded by glaring headlight rays. In addition to the lamp casing 19, two smaller lamp casings 22 are mounted on the lower portion of the shell 18, for directing light rays toward the right side of the road.

In the modification shown in Figures 5 and 6, the radiator shell 23 has the reflecting strips 24 which extend vertically, those at the right of the vertical center of the radiator being canted or inclined toward the left of the automobile, while those at the left are canted or inclined toward the right. At each side of the radiator there is mounted a headlight lamp casing 25, such casing having a lateral portion 26 for directing light rays on the adjacent strips 24, with the result that such rays will be reflected forwardly. The casing 25 is also provided with an opening 25', to direct light down on the ground. This shell 23 is similarly provided with the lamps 27, on the lower portion thereof, for directing light downwardly and toward the right side of the road.

Referring now to Figure 7, it will be noted that this construction is similar to that of Figures 5 and 6, except that the front of the radiator inclines laterally and forwardly, from opposite sides thereof, as shown at 28, and on these faces are mounted the reflecting strips 29, said strips being canted or inclined similarly to the strips 24. The shell 30 is also provided with the lower lamps 31, and receives light from the lateral openings of the lamps 25'.

In Figure 4 there is shown a form of the device which is adapted to be attached to the ordinary radiator. This includes a frame 32 having the bolts 33 which are adapted to be passed through openings formed in the radiator. Extending transversely of the frame 32, to lie in front of the radiator, are the reflecting strips 34, and formed on the upper portion of the frame is a casing 35, in which is disposed a lamp 36, for shedding its light on the faces of the strips, and also on the road, in front of the automobile. A pair of lamp casings 37 are mounted on the lower portion of the frame 32, for shedding light on the road at the right side of the automobile.

From the foregoing it will readily be seen that I have provided a novel and efficient means for illuminating the front of an automobile, for the purpose of enabling the drivers of approaching automobiles, as well as pedertrians, to clearly see the automobile, equipped with the present invention, without the usual discomfort, and danger incident to the use of glaring headlights, spotlights, and the like. Furthermore, the automobile so equipped, is capable of shedding sufficient light on the road ahead, to permit safe driving. Also, while illuminating the front of the automobile, advantage is taken of the use of advertising matter, on which light is shed, so that approaching drivers, as well as pedestrians, may see such advertisements.

What is claimed is:

1. The combination with the radiator of an automobile, of a plurality of parallel reflector elements mounted on the front of the radiator, and a lighting means for directing light rays toward the ground in advance of the automobile, and for directing light rays against said reflector elements.

2. The combination with the radiator and headlight of an automobile, the latter having auxiliary lights associated therewith, the said auxiliary lights being disposed at such angles as to direct the light rays down toward the ground in advance of the automobile and to direct light rays upwardly toward the radiator, and a plurality of parallel canted reflecting elements on the radiator for reflecting such light rays forwardly with the result that the front of the automobile is illuminated.

3. The combination with an automobile radiator, of a reflector on the radiator in covering relation to the front thereof and comprising a plurality of spaced strips permitting entrance of air to the radiator, and a light means for directing light rays forwardly and downwardly as well as sidewise, and for directing light rays against the reflecting strips.

4. The combination with an automobile radiator, of a reflector on the radiator in covering relation to the front thereof and comprising a plurality of spaced canted and jalousied reflecting strips permitting entrance of air to the radiator, and a light means for directing rays forwardly and downwardly a swell as sidewise, and for directing light rays against said reflecting strips, said reflecting strips extending throughout one dimension of the said radiator.

In testimony whereof, I affix my signature.

JOHN W. JACKSON.